Patented Nov. 7, 1939

2,179,190

UNITED STATES PATENT OFFICE 2,179,190

DISAZO DYESTUFFS AND THEIR MANUFACTURE

Adolf Krebser, Riehen, near Basel, Switzerland, assignor to J. R. Geigy A. G., Basel, Switzerland No Drawing. Application February 21, 1939, Serial No. 257,721. In Switzerland February 26, 1938

5 Claims. (Cl. 260—191)

This invention relates to the manufacture of valuable disazo-dyestuffs which dye animal fibres violet to reddish blue shades of very good fastness to light.

The new dyestuffs possess the general formula:

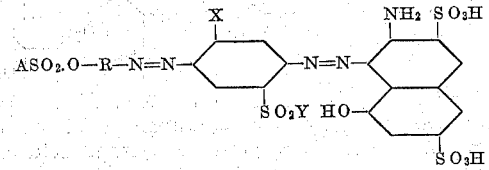

wherein A represents an aromatic radical of the benzene series, R represents the radical of a phenol coupled in the p-position, X represents one member of the group consisting of H, $CH_3$, O, $C_2H_5O$ and $CH_3$, and Y is one member of the group consisting of the OH-group, the amido-, alkylamido- and phenylamido-group, an alkyl, the benzyl and an aryl radical of the benzene series.

The new dyestuffs exhibit the advantage of better light fastness in comparison with known disazo-dyestuffs, especially those of the benzidine series, containing a phenol coupled in the p-position and being esterified with aryl sulphochlorides. Furthermore they are the bluest disazo-dyestuffs of this series with this excellent fastness to light and fulling and show a remarkable dischargeability which property was not known up to date in the series of disazodyestuffs of the violet to violet-blue range with this excellent degree of fastness to light and fulling.

According to the present invention these new dyestuffs are produced either from the monoazo dyestuffs of the formula

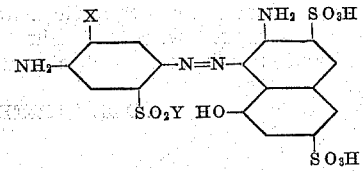

by diazotizing and combining with a phenol, capable of being coupled in the p-position and subsequent treatment with aryl sulphonic acid chlorides or from the diazo compounds of the monoazo dyestuffs of the formula

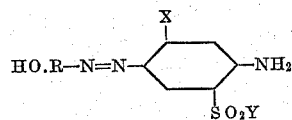

by coupling in acid solution with 2:8-aminonaphthol-3:6-disulphonic acid and esterifying with an aryl sulphonic acid chloride. The symbols X, Y and R in these formulae have the above defined meanings.

The invention is illustrated by the following examples:

Example 1

51.8 kg. of the monoazo dyestuff, p-phenylenediamine-o-sulphonic acid-azo-2:8-aminonaphthol-3:6-disulphonic acid, obtained by known processes by coupling diazotized 4-nitraniline-6-sulphonic acid with 2:8-amino-naphthol-3:6-disulphonic acid in acid solution and reduction of the nitromonoazo dyestuff with sodium sulphide, are diazotized with 6.5 kg. of sodium nitrite and 40 kg. of 30% hydrochloric acid at 0° C. and combined in the cold with a soda alkaline solution of 10.9 kg. of m-cresol. After the coupling has been completed, which is the case in a short time, the whole is heated to 75° C., and an excess of soda and thereupon 50 kg. of p-toluene-sulphonic acid chloride are added, the temperature of 75° C. being maintained until the esterification is completed, then the dyestuff is salted out, filtered and dried.

The new dyestuff, a dark powder, dissolves violet in water, green-blue in concentrated sulphuric acid and dyes wool in an acid bath beautiful, light-fast violet shades.

When instead of m-cresol there are used other phenols capable of being coupled in the p-position as for example phenol, o-cresol or 1:3:6-xylenol and instead of p-toluene sulphonic acid chloride, other aryl sulphonic acid chlorides, such as benzene- or p-chlorobenzene sulphonic acid chloride, similar dyestuffs are produced.

Example 2

62.1 kg. of the monoazo dyestuff p-phenylenediamine - o - sulphoethylanilideazo - 2:8 - aminonaphthol-3:6-disulphonic acid, obtained by the known process by coupling diazotized 4-nitraniline-6-sulphoethylanilide with 2:8-aminonaphthol-3:6-disulphonic acid in acid solution and reduction of the nitroazo dyestuff with sodium sulphide, are diazotized with 6.5 kg. of sodium nitrite and 40 kg. of 30% hydrochloric acid at 0° C. and combined with a soda alkaline solution of 9.5 kg. of phenol. After a short time the coupling is completed, the whole is heated to 75° C., 50 kg. of p-toluene sulphonic acid chloride are added, this temperature being maintained until the esterification is completed, the dyestuff is salted out, filtered and dried.

The new dyestuff constitutes a dark powder; it dissolves in hot water with a blue-violet color and in sulphuric acid with a green-blue color and dyes wool and silk from the neutral or acid bath light-fast, bluish-violet shades.

In the same way as in Example 1 the components used may be varied. When using instead of the above mentioned monoazo dyestuff a similar dyestuff, which contains instead of the sulphoethylanilide-group the sulphonic acid amide-, sulphonic acid diethyl- or -dimethyl-amide group or the monoazo dyestuff p-phenylene diamine-o-methylsulphone-azo-2:8-aminonaphthol-3:6-disulphonic acid or similar monoazo dyestuffs with ethyl, propyl, butyl, amyl, benzyl, phenyl or tolyl sulphone groups, disazo dyestuffs with similar properties are obtained.

*Example 3*

32.3 kg. of 4-amino-2-methoxy-4'-hydroxyazobenzene-5-sulphonic acid, obtained from 4-nitro-2-methoxy-aminobenzene-5-sulphonic acid by diazotizing and coupling with phenol and reduction of the nitro-azo dyestuff with sodium sulphide, are diazotized as usual with 7 kg. of nitrite and 30 kg. of 30% hydrochloric acid and thereupon coupled in acid solution or suspension with 31.9 kg. of 2:8-aminonaphthol-3:6-disulphonic acid. After 24 hours the mixture is made alkaline with soda and the phenolic hydroxyl group is esterified by means of 45 kg. of p-toluene sulphonic acid chloride. After the reaction has been completed, salting out, filtering and drying are effected. The new dyestuff dissolves blue-violet in water, green-blue in concentrated sulphuric acid and dyes wool and silk fast reddish-blue shades.

In this case also the different components may be varied as indicated above in Examples 1 and 2; the 4-amino-2-methoxy-4'-hydroxyazobenzene-5-sulphonic acid may be replaced by the corresponding 2-ethoxy- or 2-methyl-compound.

What I claim is:

1. The disazodyestuffs corresponding in the free state to the following general formula

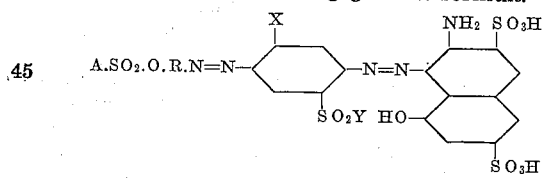

wherein A represents an aromatic radical of the benzene series, R represents the radical of a phenol coupled in the p-position, X represents one member of the group consisting of H, CH₃, O, C₂H₅O and CH₃, and Y is one member of the group consisting of the OH-group, the amido-, alkylamido- and phenyl-amido-group, an alkyl, the benzyl and an aryl radical of the benzene series, said dyestuffs being dark powders, soluble in water with violet to reddish blue color, dyeing animal fibres in an acid bath violet to reddish blue shades of good fastness to light and fulling.

2. The disazodyestuffs corresponding in the free state to the following general formula

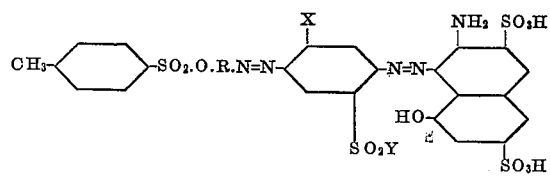

wherein R represents the radical of a phenol coupled in the p-position, X represents one member of the group consisting of H, CH₃, O, C₂H₅O and CH₃ and Y is one member of the group consisting of the OH-group, the amido-, alkylamido- and phenylamido-group, an alkyl, the benzyl and an aryl radical of the benzene series, said dyestuffs being dark powders, soluble in water with violet to reddish blue color, dyeing animal fibres in an acid bath violet to reddish blue shades of good fastness to light and fulling.

3. The disazodyestuff corresponding in the free state to the formula

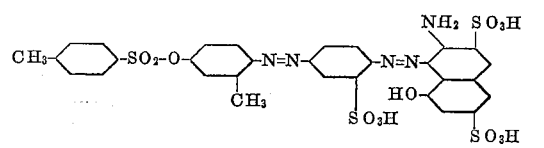

being a dark powder soluble in water with a violet color, in concentrated sulphuric acid with a green-blue color and dyeing wool in an acid bath beautiful shades of very good fastness to light and fulling.

4. The disazodyestuff corresponding in the free state to the formula

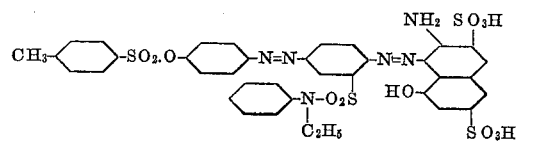

being a dark powder soluble in hot water with a violet-blue color, in concentrated sulphuric acid with a green-blue color and dyeing wool and silk from neutral or acid bath bluish-violet shades of good fastness to light and fulling.

5. The disazodyestuff corresponding in the free state to the formula

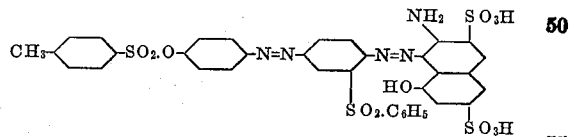

being a dark powder, soluble in water with a violet color and in concentrated sulphuric acid with a blue color and dyeing wool and silk beautiful violet shades of good fastness to light and fulling.

ADOLF KREBSER.